W. H. OOT.
MILK BOTTLE PROTECTOR.
APPLICATION FILED NOV. 26, 1913.
1,097,186.
Patented May 19, 1914.
3 SHEETS—SHEET 2.
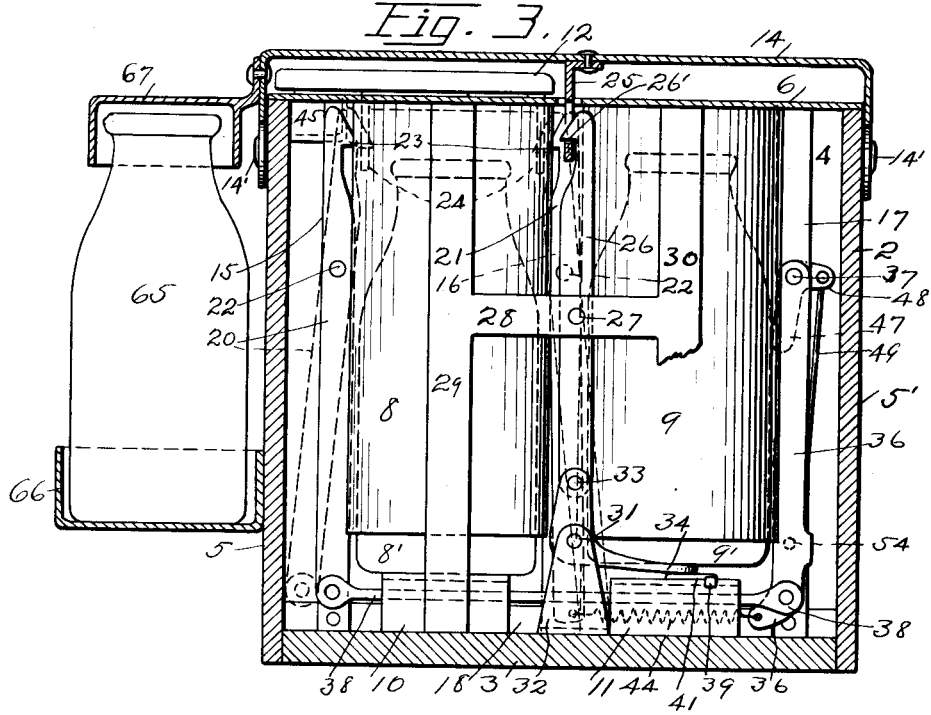
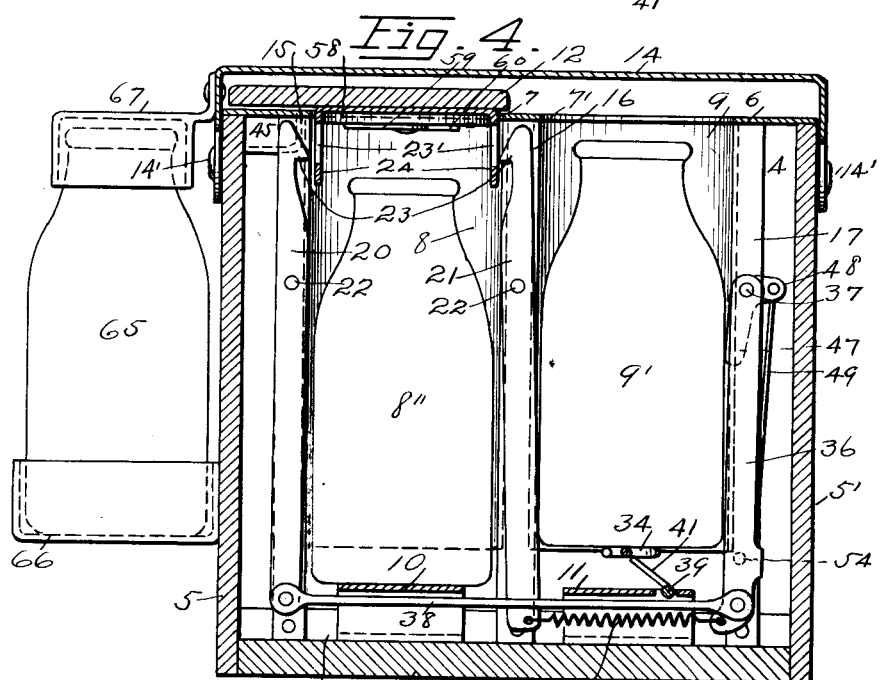
WITNESSES:
Geo. De Wallace.
INVENTOR.
William H. Oot
BY Harry De Wallace
ATTORNEY.

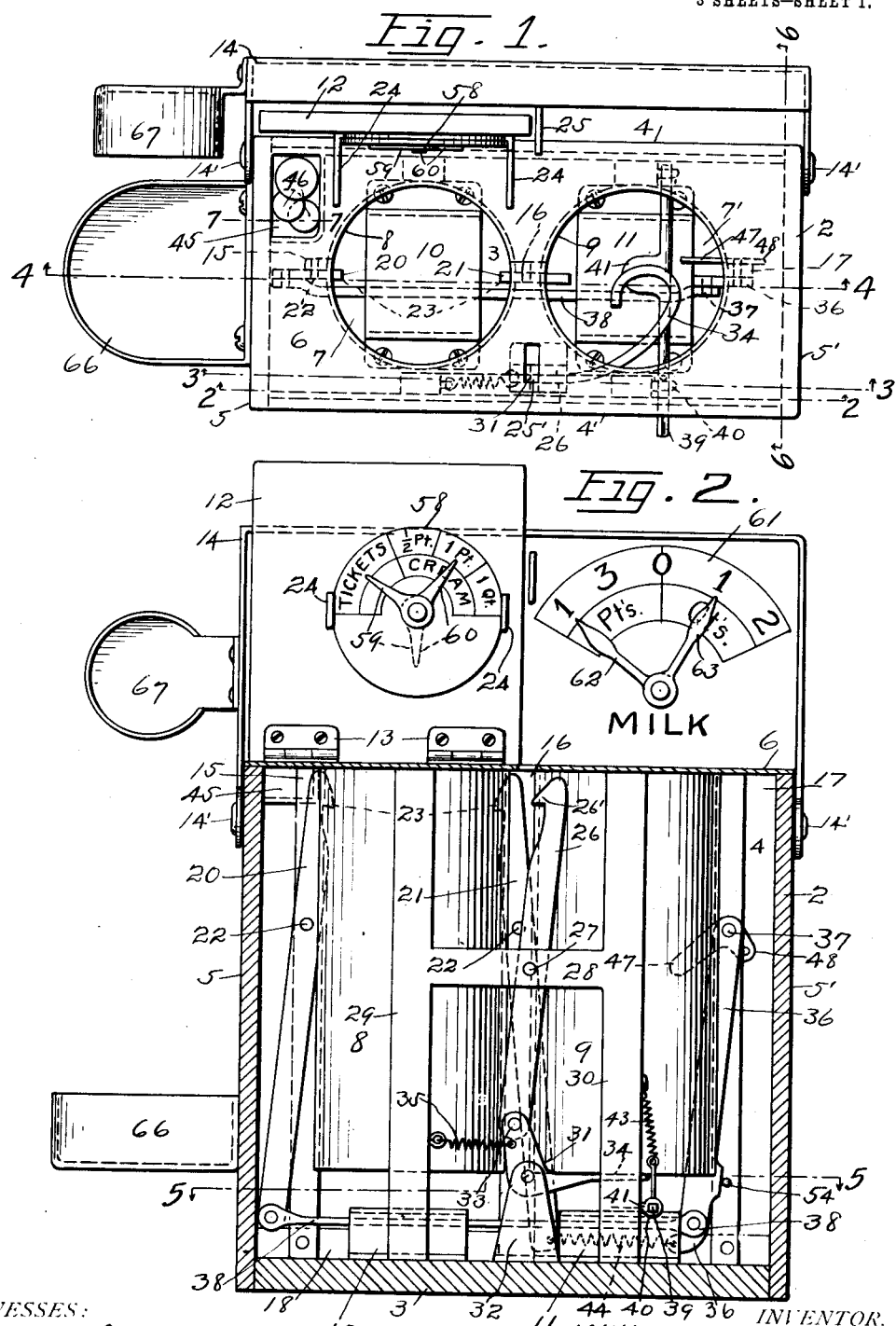

W. H. OOT.
MILK BOTTLE PROTECTOR.
APPLICATION FILED NOV. 26, 1913.
1,097,186.
Patented May 19, 1914.
3 SHEETS—SHEET 3.
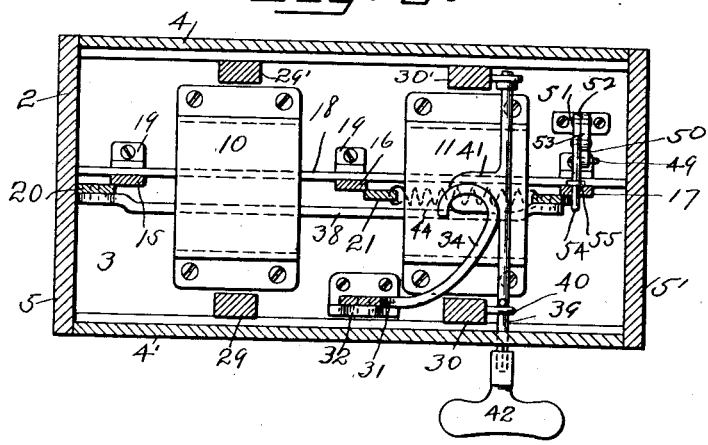
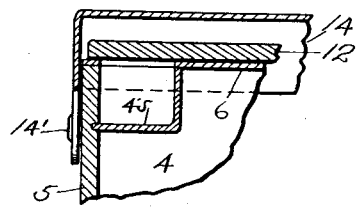
WITNESSES:
A. C. Thomas
Geo. De Wallace
INVENTOR.
William H. Oot
BY Harry De Wallace
ATTORNEY.

UNITED STATES PATENT OFFICE.

WILLIAM H. OOT, OF SYRACUSE, NEW YORK.

MILK-BOTTLE PROTECTOR.

1,097,186.

Specification of Letters Patent. Patented May 19, 1914.

Application filed November 26, 1913. Serial No. 803,336.

*To all whom it may concern:*

Be it known that I, WILLIAM H. OOT, a citizen of the United States, residing at Syracuse, in the county of Onondaga and State of New York, have invented certain new and useful Improvements in Milk-Bottle Protectors, of which the following is a specification.

This invention relates to improvements in milk bottle protectors, and has for its object to provide a novel, simple and sanitary device of the class, comprising a box or case which is arranged to hold and inclose a number of bottles, and which is self-locking for preventing tampering with the receptacle or the contents.

A further object is to provide a compartment for depositing an empty milk bottle containing money to pay for tickets, milk or cream, the said compartment capable of being securely locked for preventing pilfering of the money.

A further object is to provide means under the control of the milkman, for unlocking the said compartment.

A further object is to provide a plurality of locking means for preventing access to the box by unauthorized persons, after the milk and change have been deposited therein. And a further object is to provide means for indicating the number of tickets and also the amount of milk or cream wanted by the customer.

The various features and parts of the invention will be understood from the detailed description which follows, and by reference to the accompanying drawings, in which—

Figure 1 is a top plan view of the device; showing the covers in open position. Fig. 2 is a vertical section of the same, taken on line 2—2 of Fig. 1. Fig. 3 is a vertical cross-section, substantially on line 3—3 of Fig. 1; showing the position of the parts immediately after the milk has been delivered. Fig. 4 is a central vertical cross-section substantially on line 4—4 of Fig. 1; showing the position of the parts following the unlocking of the case by the customer for removing the milk. Fig. 5 is a horizontal section substantially on line 5—5 of Fig. 2. Fig. 6 is a vertical section taken on line 6—6 of Fig. 1; showing an auxiliary locking mechanism. Fig. 7 is a sectional view taken on line 7—7 of Fig. 1.

Similar characters of reference are assigned to corresponding parts throughout the several views.

In the drawings, 2 represents generally the case or box which incloses all of the working parts, and which comprises the bottom 3, sides 4 and 4', ends 5 and 5' and top 6, the latter being perforated at 7 and 7' for inserting and removing the milk bottles. For the purpose of explaining my invention, the casing 2 of the present device is arranged to receive but two bottles, and for this purpose I provide similar tubular parts 8 and 9, which are preferably made of sheet metal, and these are arranged concentric to the perforations 7 and 7' of the top 6. The tubes or cylinders 8 and 9 extend downwardly to within a short distance of the bottom 3, and their lower open ends are positioned directly over raised platforms or floors 10 and 11, which sustain the weight of the bottles. These platforms are preferably made of sheet metal and are secured in suitable manner to the bottom 3.

12 represents a lid or cover which is secured to the top 6 by hinges 13. This cover is arranged to close the cylinder 8, while a larger lid or cover 14, which is hinged to the opposite ends of the case 2 by pins 14', is arranged to inclose the entire top of the case, including the cover 12. 15, 16 and 17 represent similar upright supports the lower ends of which are connected to a horizontal bar 18 disposed between the bottom 3 and the platforms 10 and 11, the said bar being held in place by brackets 19. The supports 15, 16 and 17 are disposed in line with the axes of the cylinders 8 and 9 (see Figs. 1 and 5), the cylinders being slotted at their opposite sides to receive the edges of the supports. 20 and 21 represent similar upright levers which are pivoted to the supports 15 and 16 by pins 22, the upper ends of said levers being provided with facing hooks 23, for engaging slots 23' in lugs 24, which are mounted on the under face of the lid 12, so that whenever lid 12 is closed the hooks 23 are first spread apart and then close up sufficiently for the hooks to enter the slots 23', for holding the said lid in closed position (see dotted lines in Fig. 3). The main cover 14 is provided with a perforated lug 25 which passes through a slot 25' in the top 6, and this cover is locked and held in closed position by a hook 26' of a lever 26, which is pivoted by a pin 27 to a tie 28 which extends between and connects to upright supports 29 and 30. The lever 26 is operated by a bell-crank 31, which is pivoted in a bracket 32 mounted on the bottom 3, the said lever being connected to one arm of said bell-crank by a pin 33, while the opposite arm of the bell-crank is formed into a large hook or loop 34 which is disposed at the bottom of the cylinder 9 just above the platform 11. The lever 26 is held in the released position shown in Fig. 2, by a spring 35, which connects at its opposite ends to the support 29 and the bell-crank 31, and when lever 26 and the bell-crank are in the released position, the hook 34 is elevated from the platform 11 (see Figs. 2 and 4). 36 represents a third lever the upper end of which is pivoted by a pin 37 to the support 17, the lower end being connected to a rod 38 which passes beneath the platforms 10 and 11 and its opposite end connects with the lower end of the lever 20. In this way lever 20 is controlled by lever 36. When the receptacle is empty, as shown in Figs. 1 and 2, the lower ends of the levers 21 and 36 project into the cylinder 9, so that by insertion of a bottle as 9' into the cylinder 9, these levers are spread apart sufficiently to withdraw the hooks 23 from the slots in the lugs 24, which releases the small lid 12. This is the only way in which the lid 12 may be unlocked. It requires the insertion of the bottle the full distance into the cylinder 9 (see Fig. 3) whereby its weight depresses the loop-arm 34 of the bell-crank 31, in order to set and hold the lever 26 in the locking position for engaging the lug 25 when the cover 14 is moved into the closed position.

When the cover 14 is locked by the lever 26, as described, it cannot be released for removing the contents of the case, except by the manipulation of an independent releasing mechanism, which will now be described: 39 represents a rod which is journaled in a loop-guide 40 attached to the support 30. The rod 39 extends across the top of the platform 11, at a point near the center of the cylinder 9, and is fitted with an arm 41, which is disposed between the loop 34 of the bell-crank and the top of the platform 11. The rod 39, in the present case, has its outer end squared to receive a key 42, by which the said rod may be partially rotated for causing the arm 41 to lift the loop-arm of the bell-crank, and also the bottle which rests upon said loop from the position shown in Fig. 3 to that shown in Fig. 4. The lifting of the loop 34 rocks the bell-crank in the direction for swinging the upper end of the lever 26 out of engagement with the lug 25 of the cover 14. The said cover may then be raised and the milk bottles removed from the cylinders 8 and 9. The key shaft or rod 39 and its arm 41 are held in the normal position, shown in Figs. 2 and 3, by a spring 43, one end of which connects with said rod, while the other end connects with the support 30.

The levers 20, 21 and 36 are held in the normal position shown in Figs. 1 and 2, by a spring 44, which is disposed beneath the platform 11. The opposite ends of the spring 44 connect to the levers 21 and 36, and tend to draw their lower ends toward each other, and through the connecting-rod 38 force and hold the lower end of the lever 20 away from the cylinder 8.

It sometimes happens that a larger amount of money is left by the customer than is necessary to pay for tickets, or milk, and the milkman is required to leave the change, which is frequently stolen or otherwise unaccounted for. In order to safeguard the change, as 46, which is deposited in the box 2, I provide a receptacle consisting of a small tray 45, which is preferably disposed in an opening in the top 6 of the box, and has an open top which is closed by the lid 12 when this part is in the position shown in Figs. 3, 4, 6 and 7. To prevent the operation of the levers 20, 21 and 36 by the insertion into the cylinder 9 of one's hand for unlocking the lid 12 for gaining access to the money in the cylinders 8 or in the tray 45, I provide an auxiliary locking mechanism, which will now be described: 47 represents a trigger or finger, forming a part of a bell-crank which is pivoted at 37 to the support 17. The said trigger projects into the cylinder or compartment 9, as shown in Figs. 1 and 2, directly in the path of the bottle 9', so that when the bottle is inserted in the cylinder it depresses the trigger to the extent shown by comparing Fig. 2 with Figs. 3 and 4. The other arm 48 of the bell-crank connects with a rod 49 which passes downwardly outside of the cylinder 9 and connects with an arm 50 of another bell-crank, which is pivoted at 51 to a bracket 52. The upper arm 53 of the said bell-crank connects with a bolt or rod 54, which is guided by a loop 55 in which it is reciprocated by the operation of the trigger 47. The forward end of the bolt 54 engages the outer edge of the lever 36, when the parts are in the normal positions shown in Figs. 1 and 2, and prevents the said lever, from being moved from the said position to that shown in Figs. 3 and 4. When, however, a bottle is inserted in the cylinder 9, it depresses the trigger 47, which withdraws the bolt 54 from the full to the dotted line position shown in Fig. 6, which allows the bottle, as it descends in the well 9, to operate the levers 21 and 36 and the lever 20, for unlocking the lid 12. When the bottle is withdrawn from the cylinder 9, a spring 56 attached to the arm 50 of the lowermost bell-crank restores all of the parts to the normal position shown in Figs. 1, 2 and 5.

The lid 12 is provided with a dial 58 for denoting tickets and cream, and a double indicator having hands or arms 59 and 60 for indicating both tickets and cream. When neither tickets nor cream is wanted, the pointers 59 and 60 may both be shifted to the position shown in dotted lines. 61 represents a segment of a dial which is mounted or inscribed upon the inner face of the lid 14, and is employed for denoting the amount of milk wanted. A double indicator comprising pointers 62 and 63 pivotally mounted on the cover, may be set for indicating one or two portions of milk. In case more milk or cream is ordered than the main case 2 will accommodate, a third bottle, as 65, may be disposed in a cup-like holder 66 which is attached to the end 5 of the case. This extra bottle will then be held in place, its top protected from dirt, and its removal prevented, by means of an inverted cup-shaped cap 67 which is secured to the corresponding end of the cover 14. When the cover 14 is closed and locked, it is impossible to remove the bottle 65 until the said cover is unlocked by the key 42, as described.

The operation of my device is as follows: Assuming that the box 2 is empty, as shown in Figs. 1 and 2, the customer opens the lids 12 and 14, which may be done without the use of a key 42 because the various locking means are in the released positions, and inserts an empty bottle, as 8' in the cylinder or compartment 8. The pointer 59 is set to indicate tickets wanted, the customer places money in the empty bottle 8' to pay for the tickets, and then sets the pointer 60 to indicate one pint of cream. He then closes the lid 12, which is automatically locked by the hooks 23 of the levers 20 and 21 entering the slots 23' in lugs 24. He next closes the lid 14, but the said lid is not locked, because the compartment 9 is empty, and the levers 21, 26 and 36 remain in the normal position shown in Fig. 2. If anyone but the milkman opens the lid 14, he cannot gain access to the compartment 8 where the money is deposited, unless he is able to manipulate the levers 21 and 36 and also the trigger 47. When the milkman arrives, he lifts the cover 14 and notes the amount of milk wanted, as indicated on the dial 61. He immediately inserts a quart bottle 9' in the cylinder 9, which first trips the trigger 47 and then spreads the lower ends of the levers 21 and 36, and through the rod 38 the lever 20, which rocks the levers 20 and 21 in the direction for withdrawing the hooks 23 from the lugs 24, which release the cover 12. He then withdraws the empty bottle 8' and extracts the money therefrom. Upon raising the lid 12, he notes that the dial 58 indicates that the customer wants tickets and one pint of cream. He deposits the tickets in a convenient part of the box 2 and makes the proper change, which he deposits in the tray 45. He may then place the pint bottle of milk 8" in the cylinder 8 and the pint of cream 65 in the holder 66. He then closes the covers 12 and 14. By the closing of the cover 14 while there is a bottle in the compartment 9, the hook 26' of the lever 26 engages the slot in the lug 25, which securely locks the cover 14 in the closed position. After this is done, neither the milkman nor any other person can gain access to the inside of the box 2, unless he has a key similar to 42 by which the shaft 39 may be operated, as described.

It is obvious that some changes or modifications may be made in the parts of the device, as well as in the arrangement of the same, within the scope defined by the appended claims, without departing from the spirit of my invention.

Having thus described my invention, what I claim as new and desire to secure by Letters Patent, is—

1. A milk bottle protector, comprising a case having a plurality of compartments for disposing the bottles, a lid for closing one of said compartments, means for locking said lid in closed position, a cover for inclosing said lid and also the other of said compartments, means for locking said cover in closed position, and a part actuated by one of the bottles adapted to release said lid locking means.

2. A device of the class described, comprising a box having a plurality of cylindrical compartments for containing milk bottles, one of said compartments provided with a lid, means for locking said lid for preventing access to money disposed in said compartment, a pair of levers disposed in the second compartment, means for rocking said levers for unlocking the lid of the first compartment, and an auxiliary mechanism adapted for preventing the accidental or fraudulent operation of said levers.

3. A milk bottle protector, comprising a case having separate compartments for disposing milk bottles, one of said compartments adapted for receiving an empty bottle containing money, a lid for closing said compartment, means for locking said lid in closed position, a plurality of levers disposed in the adjacent compartment adapted to be operated by a bottle when inserted therein for releasing said lid for permitting the removal of the empty bottle and the money, a cover adapted for inclosing the top of said case, and means for locking said cover for preventing the removal of the milk and change from said case.

4. A milk bottle protector, comprising a box provided with a number of similar compartments for disposing milk bottles, means for closing and locking one of said compartments while the adjacent compartment is empty, means actuated by the insertion of a bottle in the empty compartment for unlocking the first compartment, a cover for said box, said cover adapted to close both of said compartments, means actuated by the weight of a bottle disposed in the empty compartment for locking said cover in closed position, and a key controlled mechanism adapted for lifting the bottle for allowing the automatic unlocking of said cover.

5. A device of the class described, comprising a box having openings in its top for inserting a number of bottles, a cover for closing one of said openings, a plurality of levers disposed below said opening having hooks adapted to hold said cover in the locked position, a hinged lid adapted to inclose the entire top of said box and provided with a perforated lug which passes through said top, a lever pivoted forwardly of the said openings and provided with a hook for engaging said lug, and a bell-crank operated by the weight of a bottle inserted in the adjacent opening adapted for moving the hook-end of said lever into locking position.

6. A device of the class described, comprising a box provided with a plurality of compartments adapted to receive milk bottles, one of said compartments provided with a lid adapted to conceal money deposited therein, means within said compartment for automatically locking said lid in closed position, a plurality of levers disposed in the second compartment in the path of a bottle when inserted therein, said levers adapted to be rocked by the bottle for unlocking said lid, a bolt adapted for preventing the rocking of said levers, a trigger in said second compartment adapted to be tripped by the bottle for releasing said bolt, a cover for inclosing the top of said box, and a locking mechanism actuated by the weight of the bottle adapted to lock said cover in the closed position.

In testimony whereof I affix my signature in presence of two witnesses.

WILLIAM H. OOT.

Witnesses:
HARRY DE WALLACE,
WM. C. ANDERSON.